(12) United States Patent
Marigliano et al.

(10) Patent No.: US 8,553,845 B2
(45) Date of Patent: Oct. 8, 2013

(54) METHOD FOR THE STATUS ANALYSIS OF A SUBSCRIBER LOOP TO SUPPORT BROADBAND TELECOMMUNICATION SERVICES

(75) Inventors: Flavio Marigliano, Turin (IT); Gianfranco Panarotto, Turin (IT); Rosaria Persico, Turin (IT)

(73) Assignee: Telecom Italia S.p.A., Milan (IT)

( * ) Notice: Subject to any disclaimer, the term of this patent is extended or adjusted under 35 U.S.C. 154(b) by 714 days.

(21) Appl. No.: 12/448,648

(22) PCT Filed: Dec. 29, 2006

(86) PCT No.: PCT/IB2006/003796
§ 371 (c)(1),
(2), (4) Date: Feb. 22, 2010

(87) PCT Pub. No.: WO2008/081215
PCT Pub. Date: Jul. 10, 2008

(65) Prior Publication Data
US 2010/0158200 A1    Jun. 24, 2010

(51) Int. Cl.
*H04M 1/24* (2006.01)
*H04M 3/08* (2006.01)
*H04M 3/22* (2006.01)

(52) U.S. Cl.
USPC .......................................... 379/1.04; 379/24

(58) Field of Classification Search
USPC ................. 379/1.03, 1.04, 23, 24, 27.08, 28, 379/29.09; 375/222, 224, 225
See application file for complete search history.

(56) References Cited

U.S. PATENT DOCUMENTS

| | | | |
|---|---|---|---|
| 6,091,713 A * | 7/2000 | Lechleider et al. | 370/248 |
| 6,266,395 B1 | 7/2001 | Liu et al. | |
| 6,633,545 B1 * | 10/2003 | Milbrandt | 370/252 |
| 6,819,746 B1 * | 11/2004 | Schneider et al. | 379/29.01 |
| 6,829,330 B2 * | 12/2004 | Belge et al. | 379/22.04 |
| 7,042,983 B2 * | 5/2006 | Bauer et al. | 379/1.04 |
| 7,113,482 B1 | 9/2006 | Veeneman | |
| 2002/0176544 A1 | 11/2002 | Liu et al. | |
| 2003/0235274 A1 | 12/2003 | Afzal | |
| 2006/0098725 A1 * | 5/2006 | Rhee et al. | 375/222 |
| 2006/0159232 A1 * | 7/2006 | Jiang et al. | 379/1.03 |

FOREIGN PATENT DOCUMENTS

| | | |
|---|---|---|
| WO | WO 01/01158 A1 | 1/2001 |
| WO | WO 02/21742 | 3/2002 |
| WO | WO 2004/002039 | 12/2003 |
| WO | WO 2006/092730 | 9/2006 |

OTHER PUBLICATIONS

"Transmission and Multiplexing (TM); Access Networks; Spectral Management on Metallic Access Networks; Part 2: Technical Methods for Performance Evaluations," ETSI TR 101 830-2 v1.1.1 Technical Report, pp. 1-63, (Oct. 2005).

International Telecommunication Union, Series G: Transmission Systems and Media, Digital Systems and Networks, digital sections and digital line system—Access networks, "Physical layer management for Digital Subscriber Line (DSL) transceivers", ITU-T G.997. 1, (May 2003).

* cited by examiner

*Primary Examiner* — Quoc D Tran
(74) *Attorney, Agent, or Firm* — Finnegan, Henderson, Farabow, Garrett & Dunner, L.L.P.

(57) ABSTRACT

A method for analyzing the status of a subscriber loop belonging to an access network portion of a fixed network infrastructure, the subscriber loop not supporting a broadband service wherein the access network portion includes further subscriber loops, a set of which support broadband services. The method includes the steps of collecting attenuation measures associated with said set of subscriber loops supporting said broadband services; and processing said attenuation measures to obtain an estimation of a maximum bit rate that can be offered on the subscriber loop to be analyzed.

9 Claims, 5 Drawing Sheets

US 8,553,845 B2
METHOD FOR THE STATUS ANALYSIS OF A SUBSCRIBER LOOP TO SUPPORT BROADBAND TELECOMMUNICATION SERVICES

CROSS REFERENCE TO RELATED APPLICATION

This application is a national phase application based on PCT/IB2006/003796, filed Dec. 29, 2006.

BACKGROUND OF THE INVENTION

1. Field of the Invention

The present invention generally refers to the provision of broadband telecommunication services. In particular, the present invention refers to a method for designing a broadband telecommunication service based on a technology of the xDSL ("generic Digital Subscriber Line") type for a subscriber loop on which nowadays only traditional POTS or ISDN ("Plain Old Telephone Service" or "Integrated Services Digital Network") telephone systems are provided.

2. Description of the Related Art

The exponential increase in the popularity of the Internet and of related data services has prompted service providers in the Public Switched Telephone Network (PSTN), to seek new technologies to deliver high speed data services to their customers. One solution is provided by DSL (Digital Subscriber Line) technologies. Several DSL technologies offer high speed services over existing copper facilities commonly referred to "subscriber loops". Such technologies include ADSL ("Asymmetrical Digital Subscriber Line"); HDSL ("High-bit-rate Digital Subscriber Line"); RDSL ("Rate Adaptive Digital Subscriber Line"); SDSL ("Symmetric Digital Subscriber Line"); and VDSL (very High-speed Digital Subscriber Line"). These DSL or similar technologies are collectively known as "xDSL" services.

A problem encountered in the provision of xDSL services is that subscriber loops have largely been neglected from a technology upgrade perspective. Existing subscriber loops and the structure of the copper distribution network were originally designed for narrow band voice telephony and not to support high speed data services. Consequently, the electrical characteristics of the cables and subscriber loops set limits to the provision of broadband services: for example, many subscriber loops include wire gauge changes and bridged taps (unused extension lines) which limit the available bandwidth, limiting the performance of the loops with respect to the delivery of an xDSL service.

U.S. Pat. No. 6,266,395 discloses a method and an apparatus for single-ended qualification of subscriber loops for xDSL services. The method involves first screening a subscriber loop database for disqualifying devices or services, associated with that loop, which are incompatible with xDSL services. If none are found, a set of predetermined electrical characteristics of the subscriber loop are derived from information in the database, or directly measured using test equipment at a central office end of the subscriber loop. The electrical characteristics are used to calculate an available bandwidth for xDSL services on the subscriber loop.

In WO 02/21742 a system is disclosed that is able to predict the performance of a DSL line on an already installed telephone loop. The system obtains a topologic description of the already installed telephone loop and through it, it identifies an equivalent loop. Afterwards, the system determines DSL performance for the equivalent loop. From DSL performance of the equivalent loop, the system predicts DSL performance for the already installed telephone loop.

SUMMARY OF THE INVENTION

The Applicant has noted that each cable section composing a subscriber loop of a Copper Access Network, due to its difference with respect to other sections (in terms of length, structure, coating, type of insulating material among the subscriber loops composing it, loop number and diameter) can be seen as a transmission channel with its own electric and physical characteristics. In general, such transmission channel can introduce on a xDSL signal crossing it an attenuation, a phase distortion and a noise level that are different from those introduced by another transmission channel.

Moreover, impedance discontinuities found along a subscriber loop on its path between central station and subscriber premises, due for example to junctions of different lengths, cable terminations in network elements (ex. permutators, cabinets and distribution points) can have an even significant effect on the level and/or the quality of the xDSL signal received by the subscriber set to such loop.

From what has been stated above, it can be assumed that a Network operator could be able to obtain an adequate estimation of the maximum bit rate that can be obtained on a subscriber loop (for example depending on certain noise conditions), only having an accurate knowledge of all characteristics (cable type, diameter, etc.) of individual cable lengths composing it.

The Applicant has however noted that, in the majority of cases, the Network operator has not available a reliable and complete description of his own network in terms of transmission characteristics of individual cable sections composing it, since these information are generally unavailable on a local basis but only on a statistical basis at national or regional level.

The Applicant therefore has noted that, for a Network operator that wishes to provide a broadband service, based for example on a technology of the xDSL type, on a specific subscriber loop of his own copper access network, there is the need of adequately estimating the quality of service that can be offered on such particular loop, expressing such quality in terms of maximum bit rate that can be reached on the loop itself.

The Applicant has observed that, in order to adequately estimate the maximum bit rate that can be reached on a specific subscriber loop of a copper access network, it is enough to use attenuation measures of the DELT (Dual Ended Line Test) type associated with xDSL services already deployed in portions of network common to the subscriber loop to be qualified.

In the present description, the term "common network portion" for two or more subscriber loops means the network portion composed of the set of network cables and equipment common to said two or more subscriber loops.

In the present description, the term "attenuation measures of the DELT type" means the attenuation measures that terminal equipment, for example two xDSL modems, one placed in the Operator central, the other one placed in the subscriber premises, estimate and can exchange, through messages containing information dealing with the line status, including the cable sections, as well as perceived by each of the two terminations.

The attenuation measures of the DELT (Dual Ended Line Test) type of interest can be those provided by the ITU-T G.997.1 standard "Physical layer management for digital subscriber line (DSL) transceivers", in particular attenuation signal and attenuation loop related to uplink and downlink.

In the present description, the term "attenuation signal of a xDSL line" means the difference between transmitted power and received power, related to uplink or downlink of the line, measured on xDSL carriers used when transmitting.

In the present description, the term "attenuation loop" means the difference between transmitted power and received power, related to uplink or downlink of the line, measured on all carriers of the xDSL spectrum.

Alternatively, the same attenuation measures can be obtained by using equipment not complying with the G.997.1 standard and such as to implement algorithms of the proprietary type for estimating the attenuation measures.

A first aspect of the present invention refers to a method for analysing the status of a subscriber loop belonging to an access network portion of a fixed network infrastructure, said subscriber loop not supporting a broadband service, said access network portion comprising further subscriber loops, a set of which supporting broadband services, said method comprising the steps of:

collecting attenuation measures associated to said set of subscriber loops supporting said broadband services; and processing said attenuation measures to obtain an estimation of a maximum bit rate that can be provided on said subscriber loop to be analysed.

A second aspect refers to a system for analysing the status of a subscriber loop belonging to an access network portion of a fixed network infrastructure, said subscriber loop not supporting a broadband service, said access network portion comprising further subscriber loops, a set of which supporting broadband services, said system comprising:

a module configured for collecting attenuation measures associated to said set of subscriber loops supporting said broadband services; and a module configured for processing said attenuation measures to obtain an estimation of a maximum bit rate that can be provided on said subscriber loop to be analysed.

A further aspect of the present invention refers to an information product that can be loaded in the memory of at least one electronic processor and comprising portions of software code for carrying out the process according to the invention when the product is run on a processor: in this context, such term should be considered wholly equivalent to the mention of a computer readable medium comprising instructions for controlling a network of computers in order to carry out a process according to the invention. The reference to "at least one electronic processor" is aimed to underline the chance of performing the solution according to the invention in a de-centralised context.

Further preferred aspects of the present invention are described in the dependent claims and in the present description.

BRIEF DESCRIPTION OF THE DRAWINGS

The characteristics and advantages of the present invention will be clear from the following description of an embodiment, provided as a non-limiting example, with reference to the enclosed drawings, in which.

DETAILED DESCRIPTION OF THE INVENTION

Figure 1:
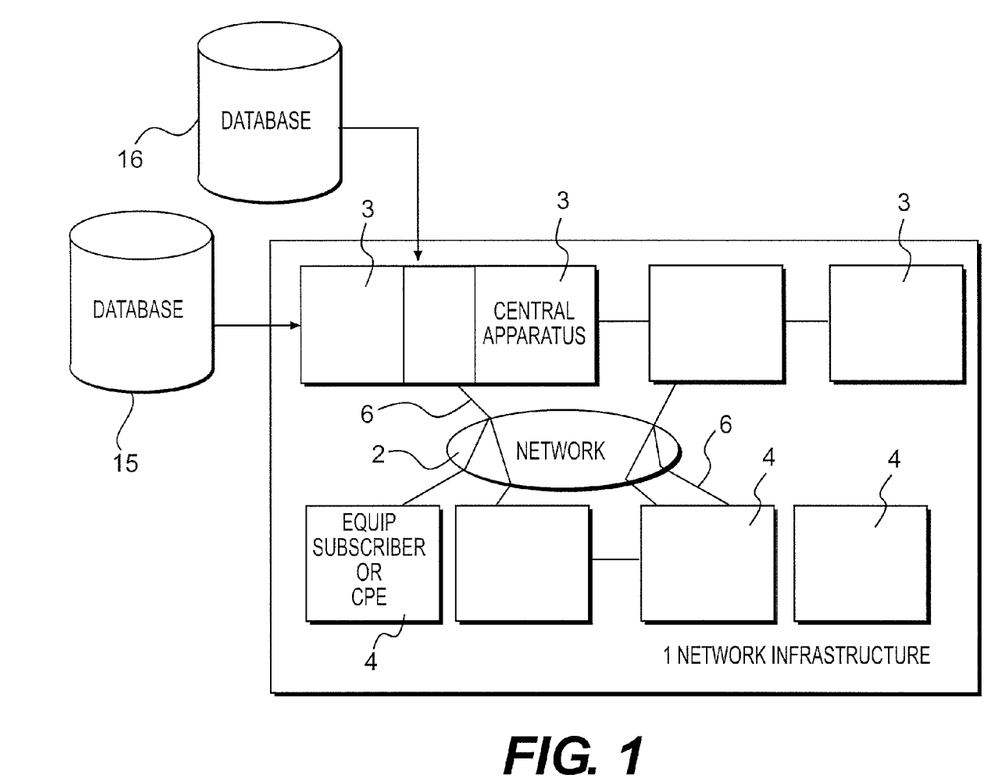
FIG. 1 is a schematic representation of a fixed network infrastructure and of suitable systems for storing information and measures related to the network infrastructure itself.

With reference to FIG. 1, the analysis method according to the invention operates on a fixed network infrastructure 1 comprising: an access network 2, central apparatus 3 (permutators, multiplexers, etc.) located in Network operator premises and equipment subscriber 4 or CPE ("Customer Premises Equipment") (for example telephones, gateways, xDSL modems, etc) located in subscriber premises.

The access network 2, for example made of copper, includes a plurality of cables 6 each guaranteeing an electric continuity between central apparatus 3 and subscriber equipment 4.

Figure 2:
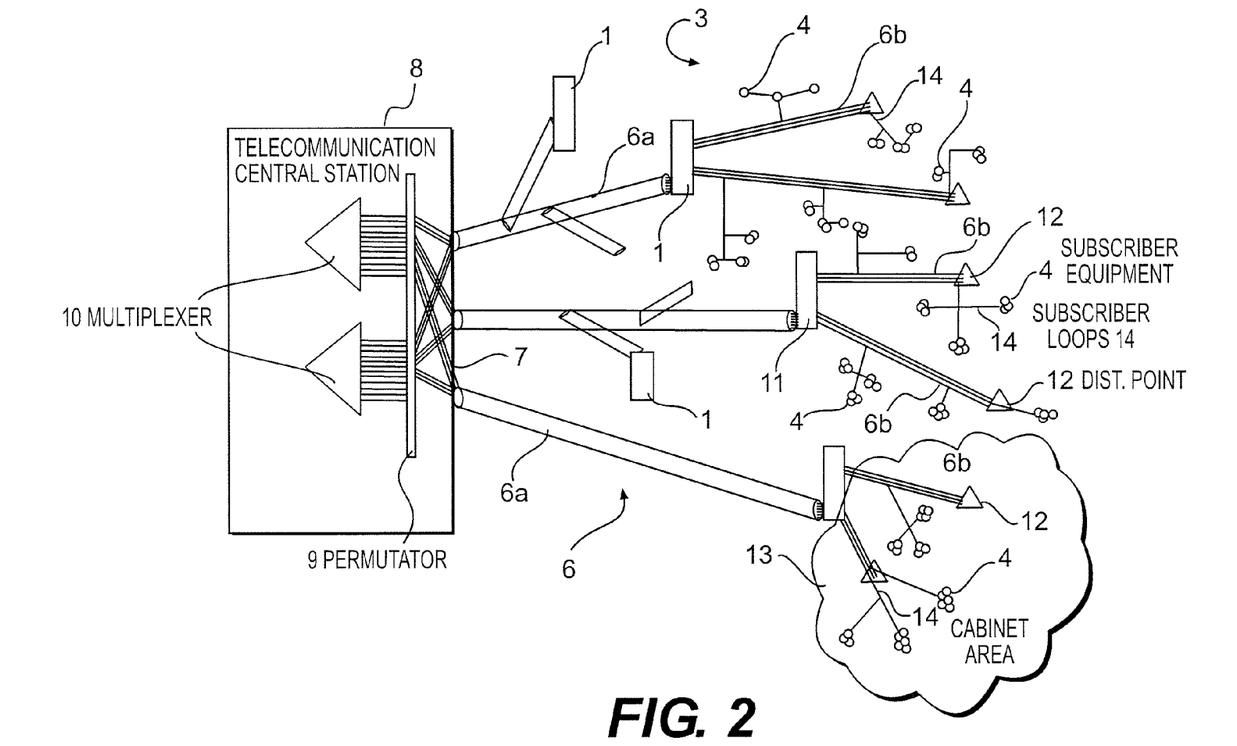
FIG. 2 is a schematic representation of an access network of the fixed network infrastructure shown in FIG. 1.

With reference now to FIG. 2, each central apparatus 3 can for example include a telecommunication central station 8, comprising a first branch and flexibility point composed of a central permutator 9 (MDF: Main Distribution Frame) in which the subscriber loops ("copper pairs") 7 converge, connected to that telecommunication central station, and multiplexers 10, so-called DSLAM ("Digital Subscriber Line Access Multiplexer"), connected through the central permutator 9 to the subscriber loops 7 and configured for managing the data traffic from the subscriber loops 7. In particular, the central permutators 9 are flexibility elements of the access network 2 through which the Network operator performs the connection between the remote subscriber equipment and the specific central apparatus responsible for delivering the service required by the remote subscriber equipment.

Each cable 6 comprises a primary section 6a that connects the central permutator 9 to one or more second branch and flexibility points implemented by a cabinet 11. Each primary section 6a includes the plurality of subscriber loops 7, a set of which supporting broadband transmission systems, for example of the xDSL type. The portions of primary section 6a connected to the central permutator 9 generally have a high transmission potential since the subscriber loops composing them are on the order of thousands, while the portions of primary section 6a connected to each cabinet 11 have a lower transmission potential, since the subscriber loops composing them are on the order of hundreds. Permutators 9, primary sections 6a and cabinets 11 compose the so-called primary access network.

Each cable 6 also comprises a plurality of secondary sections 6b (also with a more and more decreasing transmission potential along the subscriber equipment 4 direction) that connect cabinet 11 to network distribution points 12. Specifically, each cabinet 11 can be connected to many distribution points 12. The set of distribution points 12 connected to a single cabinet 11 realises the so-called "cabinet area" 13. Cabinets 11, secondary portionshs 6b and distribution points 12 realise the so-called secondary access network.

From each distribution point 12 tens of individuals subscriber loops 14 branch towards the subscriber equipments 4, each loop reaching the premises of the various users jointing a respective Domestic Network Termination, not shown in FIG. 2. Downstream of such Domestic Network Termination, the "subscriber system" develops, comprising the home wiring (namely the set of cables inside the subscriber premises) and the subscriber equipment 4. The Domestic Network Termination realises the separation element between Operator network and subscriber system.

The copper access network 2 shown in FIG. 2 can also have some variations, mainly due to system and/or cost needs.

For example, each distribution point 12 can be connected to the respective permutator 9 without using a cabinet 11. In this case, the access network 2 is called "rigid" as opposed to the above-described flexible access network model that provides for the presence of cabinets 11.

A second variation of the above described access network 2 provides that cables 6 connected between the permutator 9 and distribution points 12 cross many cabinets 11.

The analysis method of the present invention can be applied to both above described variations of the access network 2. In particular, in the second variation, the cabinet 11 that will be taken as reference cabinet is the one directly connected to the distribution point.

Specifically, the analysis method according to the invention allows a Network operator to be able to qualify:

in a flexible network, all lines of an cabinet area where there are at least two network distribution points of the broadband type equipped with validated attenuation measures of the DELT type;

in a rigid network, all network distribution point lines of the broadband type equipped with validated attenuation measures of the DELT type.

In the present description, the term "network distribution point of the broadband type" will mean a network distribution point to which at least one subscriber loop supporting a service of the xDSL type is connected.

Moreover, in the present description, the term "network distribution point of the broadband type equipped with validated attenuation measures of the DELT type" will mean a distribution point to which xDSL lines are connected, for which attenuation measures of the DELT type are available, that are validated and possibly corrected according to a series of procedures described herein below in the present description.

The analysis method of the present invention can be applied to the access network 2 and its variations provided that a set of attenuation measures of the DELT type have previously been acquired on subscriber loops deployed in a network that already supports a service of the xDSL type (defined as "xDSL lines" herein below in the present description), for both uplink and downlink of the loops themselves, and suitably stored in a measure database 15 associated with the fixed network infrastructure 1 as shown in FIG. 1.

A method for acquiring and storing such attenuation measures that can be used with the analysis method of the present invention is for example described in WO 05/094001 A1. When acquiring and storing such attenuation measures, a series of conditions should be complied with, namely:

a) for each xDSL line, in both uplink and downlink, the previously described attenuation measures of the DELT type should be acquired, in following time intervals each representing the possible attenuation conditions experimented by the xDSL line in time;

b) for each xDSL line, the minimum attenuation value measured on the line, along both uplink and downlink, should be available;

c) for each xDSL line, the maximum attenuation value measured on the line, along both uplink and downlink, should be available;

d) for each xDSL line, a mean attenuation value, along both uplink and downlink of the line itself, should be available.

Specifically, this mean value can be obtained as moving average of a certain number of subsequent measures in time.

It is advisable that the number of measures used in the moving average and their weight coefficients depend on the frequency with which measures are acquired, in addition to the method used for acquiring and storing said measures, in order to be able to modulate the weight that, when computing the mean, the most recently acquired measures have with respect to the older ones.

Figure 3:
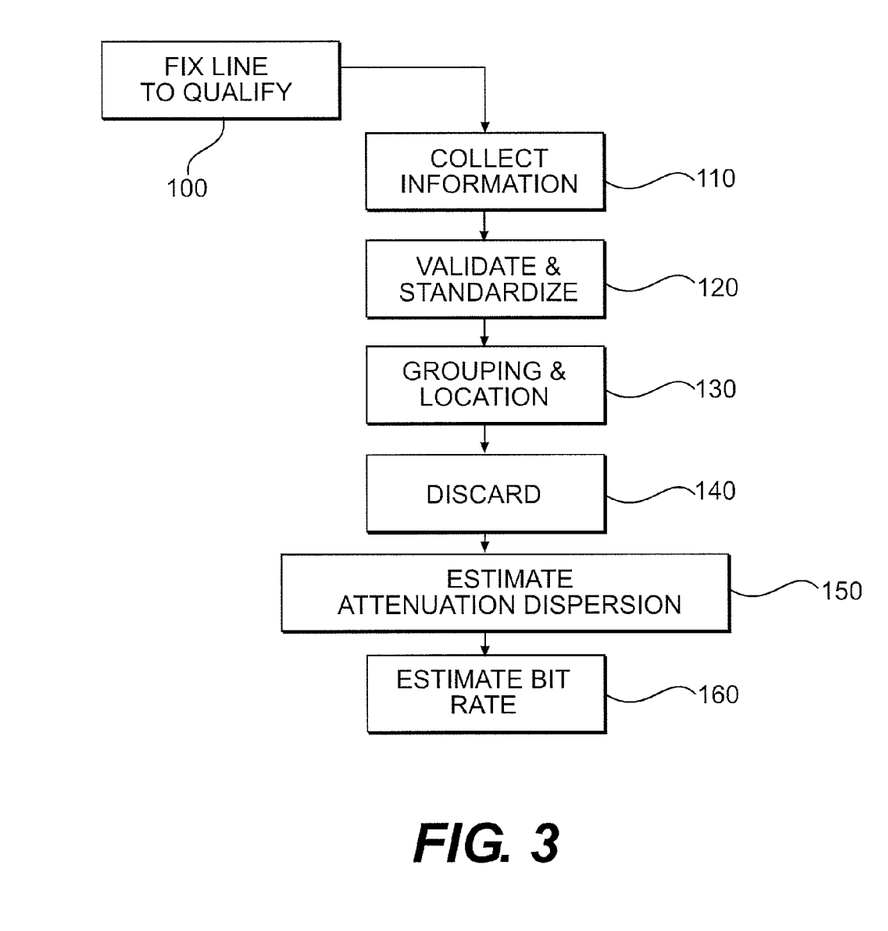
FIG. 3 shows a flow diagram related to the analysis method of the status of a subscriber loop according to the invention.

With reference now to FIG. 3, after having fixed a line to be qualified (block 100 in FIG. 3) belonging for example to a flexible network portion, the analysis method according to the invention comprises the following steps:

Step 1. Collection of Information Related to the Line to be Qualified (Block 110 in FIG. 3):

in this step cabinet 11 and distribution point 12 associated to the considered line are determined; afterwards, all distribution points 12 of the broadband type are located, belonging to the cabinet area 13 related to cabinet 11 and, for such distribution points 12 of the broadband type, attenuation measures of the DELT type, related to uplink and downlink of xDSL lines connected thereto, are recovered from the measure database 15;

Step 2 Validation and Standardisation of Measures of the DELT Type of xDSL Lines Located in Step 1 (Block 120 in FIG. 3):

in this step, attenuation measures associated to xDSL lines located in Step 1 are validated through suitable validity checks with the purpose of removing attenuation measures affected by malfunctions of data acquiring or storing systems. Possible systematic errors on measures, introduced, for example, by specific implementing modes of instruments not complying with international standards are compensated by introducing corrective factors on measures depending on the characterisation in a controlled environment (for example in a laboratory) of the instruments used for measuring the attenuation. At the end of this step, the attenuation measures of the DELT type associated to xDSL lines located in Step 1 are "standardised", namely made mutually uniform.

Step 3. Location of Distribution Points of the Broadband Type Located in Step 1 (block 130 in FIG. 3):

in this step, measures obtained in Step 2 are grouped by distribution point of the broadband type to which the measures themselves refer, and the coherence of such attenuation measures is verified, with the purpose of removing the unreliable attenuation measures, for example due to particular or atypical subscriber systems, such as those affected by a high number of branches as to introduce significant increases on the total attenuation experimented by a line with respect to the one experimented by the other lines of the same distribution point. At the end of this step, a first location in terms of mean attenuation that can be associated to distribution points 12 of the broadband type located in Step 1 is performed and a reliability index is assigned to such location. In the present description, the term "location" means determining the mean attenuation value that can be associated with the distribution point.

Step 4. Discarding the Distribution Points of the Broadband Type Located in Positions that are not Coherent with Respect to the Network Model that the Operator has (Block 140 in FIG. 3):

in this step, the coherence of the location of individual distribution points 12 of the broadband type inside the cabinet area 13 is verified with respect to "typical situations", namely to homogeneous network and territory situations (for example urban areas, extra-urban areas), that can be associated to the network portion in which such cabinet area is placed. Specifically, distribution points 12 of the broadband type whose location is unreliable as regards characterisation of attenuation dispersion of the cabinet area 13 are discarded.

If the line to be qualified is terminated in a distribution point 12 of the broadband type placed in a rigid network, the step does not apply.

Step 5. Estimation of Minimum and Maximum Attenuation Dispersion of The Cabinet Area Located in Step 1 (Block 150 in FIG. 3):

the attenuation dispersion is estimated for cabinet area 13 lines, independently whether they are associated to distribution points 12 of the broadband type or not, starting from the location performed in previous steps on broadband distribution points of the cabinet area 13 itself. Depending on such attenuation dispersion, minimum and maximum attenuation values can be determined, that can be associated with the cabinet area 13 and form the attenuation range within which measures obtained on an cabinet area 13 line, on which a xDSL service has to be provided downstream of its activation, are expected to fall. If the line to be qualified is terminated in a distribution point 12 of the broadband type placed in a rigid network, the step does not apply.

Step 6. Estimation of Maximum Bit Rate that can be Offered on the Line to be Qualified for a xDSL Service (Block 160 in FIG. 3):

depending on minimum and maximum attenuation values obtained in Step 5 for the cabinet area 13 to which the line to be qualified belongs and a noise hypothesis associated with the line itself and formed starting from:

the types of services associated to lines (so-called disturbing lines) that share the same path in the access network with the line to be qualified and such as to overlap to the spectrum related to the uplink or downlink of the xDSL service for which the line is being qualified;

the cable cross talk characteristics, that allow evaluating the portion of signal due to disturbing systems that is translated into noise on the line being qualified, a bit rate range is estimated, both for the downlink and for the uplink, within which maximum bit rates can be placed, that can be obtained on all lines of the affected cabinet area 13, and therefore also on the line to be qualified, for the xDSL service that has to be activated. If the line to be qualified is terminated on a distribution point 12 of the broadband type, the maximum bit rate that can be obtained on the line itself can be provided, since it is possible to timely locate such distribution point.

Herein below in the present description, the above described steps will be described in more detail.

It is further advisable to state that, during the present description, the term "distance" or "electric distance" means not the physical distance at which the individual network elements are placed, but the mean attenuation pertaining thereto and that can be seen as consequence of their position on the territory.

Step 1

Information to be found related to the line to be qualified can be classified into at least four categories.

Category 1. Information about Network Elements Associated to the Line to be Qualified:

given a line to be qualified (determined through a univocal identifying code, for example the subscriber's telephone number), it is necessary to locate:

1) distribution point $D_L$ to which the line is jointed;
2) cabinet $A_L$ to which distribution point $D_L$ is connected. If the line to be qualified crosses many cabinets, cabinet $A_L$ is deemed the one directly connected to distribution point $D_L$ (if the network is of the rigid type, such information is not necessary);
3) the set of distribution points $\{D_j\}$ of the broadband type connected to cabinet $A_L$ (if the network is of a rigid type such information is not necessary). The absence of distribution points of the broadband type connected to cabinet $A_L$ ends the analysis method according to the invention;
4) the set of xDSL lines $\{L_{ji}\}$ (where j is the distribution point index while i points out the i-th broadband line connected thereto) jointed to distribution points $\{D_j\}$, including those jointed to distribution point $D_L$ (if the network is of the rigid type, it is necessary to locate only the xDSL lines jointed to distribution point $D_L$). If there are no such xDSL lines, the analysis method according to the invention ends;
5) total number N_dp (where dp stands for "distribution point") of distribution points (of the broadband type and not) connected to cabinet $A_L$ (if the network is of the rigid type, this information is not necessary).

Category 2. Attenuation Measures of the DELT Type Related to the Set of xDSL Lines $\{Lji\}$:

provided that conditions a)+e) about acquisition and storage of attenuation measures are verified, for every xDSL line $L_{ji}$ it is necessary to find in the measure database 15 the following attenuation measures:

i. Uplink minimum attenuation: Att_min_UP($L_{ji}$)
ii. Uplink mean attenuation: Att_ave_UP($L_{ji}$)
iii. Uplink maximum attenuation: Att_max_UP($L_{ji}$)
iv. Downlink minimum attenuation: Att_min_DN($L_{ji}$)
v. Downlink mean attenuation: Att_ave_DN($L_{ji}$)
vi. Downlink maximum attenuation: Att_max_DN($L_{ji}$)

The even partial absence of attenuation data for a given xDSL line $L_{ji}$ brings about the exclusion of such line from the set $\{L_{ji}\}$. The exclusion of all xDSL lines $L_{ji}$ from such set instead ends the analysis method according to the invention.

The lack of reliability of the attenuation measures for one or more xDSL lines $L_{ji}$ is instead managed in Step 2.

Category 3. Type of DSLAM to which Lines $\{L_{ji}\}$ [DSLAM_T(Lji)] and Related CPE [CPE_T(Lji)] are Jointed:

this category comprises information related to xDSL technologies used on central side (DSLAM) and subscriber side (CPE) for each xDSL line $L_{ji}$, information that allow distinguishing the DSLAM and CPE manufacturers to which broadband $L_{ji}$ lines are connected. Such information can be useful for improving the results obtained as output from Step 2. In fact, above all for first generation xDSL systems (the so-called ADSL1) it can be useful to locate possible systematic corrections to be performed in Step 2 to attenuation measures performed by xDSL equipment receivers supported by each xDSL line $L_{ji}$ and afterwards stored in the measure database 15, depending on the particular xDSL equipment pair (DSLAM-CPE) associated to the xDSL line $L_{ji}$ being taken into account, since, for such systems, the attenuation measures are not standardised. This calibration requires a previous work for detecting, in a controlled environment (for example in laboratory), possible measure errors performed by various xDSL equipment pairs (DSLAM-CPE) taking also into account the accuracy in terms of granularity with which the attenuation measures are stored both inside the DSLAM and in the measure database 15. If xDSL systems are deployed in a network certified with respect to attenuation measures execution, information in category 3 are optional.

Category 4. Information for Estimating the Cross Talk Noise:

this category includes all useful information for estimating the cross talk noise in which the line to be qualified will have to operate. Information of this type can deal for example with: the existence of transmission systems that can disturb the line to be qualified at para-cross talk component NEXT level on central receiver side and/or on subscriber receiver side; the placement of the line to be qualified in the cable section taken into account with respect to other disturbing lines; cross talk coupling characteristics of subscriber loops placed next to the relevant subscriber loop; the system xDSL system type for which the line has to be qualified (SDSL, ADSL, ADSL2+, etc). Generally information belonging to such category are available at Network operator in one or more network registries related to the network infrastructure 1 (for example the database shown in FIG. 1 with number 16). Alternatively, should these information not be available for both central and subscriber side of the line to be qualified, a measure of the quiet line noise (as pointed out in ITU-T G.997.1 Recommendation) can be used or a predefined and known noise environment can be assumed, for which it is possible to model the expected network noise so that maximum bit rates guaranteed for a xDSL service that have to be estimated depend only on the attenuation.

Step 2

This step subjects attenuation measures related to individual xDSL lines $L_{ji}$ to suitable validity check to detect a possible incongruence due to malfunctions of xDSL measuring equipment and/or to errors performed when storing data. If an incongruence is detected, the xDSL line $L_{ji}$ is discarded or marked with a flag, useful in the following steps of the analysis method according to the invention.

In addition to validity checks, this step also performs corrections to attenuation measures performed by xDSL equipment realising measures that are not complying with international standards, such as ITU-T G.997.1 (for example first generation ADSL equipment), to compensate for possible systematic errors associated to these measures. The systematic errors on attenuation measures detected with non-standard methods depend, in general, on the pair of xDSL equipment used on central side and subscriber side, which can have interoperability problems. The attenuation measures detected with non-standard methods can be calibrated with measuring campaigns in a controlled environment (for example in a laboratory). In particular, possible corrections to be performed to these measures depend on the knowledge both of xDSL technology used on DSLAM side [DSLAM_T(Lji)] and on the xDSL technology used on subscriber modem side [CPE_T(Lji)]. Since often there are no complete information about xDSL technologies used by subscriber modems of each xDSL line Lji, 'mean' corrections can be used, depending only on the xDSL technology on DSLAM side. For first generation ADSL systems, the use of 'mean' corrections depending only on the technology on DSLAM side is efficient only for the uplink, while for the downlink it produces errors that are in practice not acceptable, generally due to the particular implementing mode of the xDSL modem on subscriber side.

In general, not only for first generation systems such as ADSL1, the attenuation measures related to uplink are more reliable that those related to downlink: in fact the first ones are estimated by the receiver on DSLAM side and directly stored in the MIB ("Management Information Base") of the DSLAM itself, while the second ones are estimated by the subscriber modem receiver and relayed to the DSLAM through a managing channel at physical level EOC ("Embedded Overhead Channel"). This can imply, especially for technologies of a different type on DSLAM side and subscriber modem side, errors and inaccuracies due to interoperability problems between equipment. For the same above described reasons, the attenuation measures used by the analysis method according to the invention are those related to the uplink and possible corrections to be performed deal only with these measures. However, for all checks described below, both attenuation measures related to uplink and those related to downlink are subjected to validation procedures, since also information obtained by the attenuation measures related to the downlink are used in particular cases that will be described related to Step 3 of the analysis method according to the invention.

The corrections of the attenuation measures related to uplink can be performed by summing the mean attenuation value associated with the uplink of the xDSL line $L_{ji}$ and an additional attenuation value, designated as $P(Att\_ave\_UP(Lji))$, where $P(x)$ is a polynomial with variable order that can depend on the DSLAM and CPE types to which the xDSL line $L_{ji}$ is jointed. The mean attenuation on the uplink is then given by $Att\_ave\_UP(L_{ji}) = Att\_ave\_UP(L_{ji}) + P(Att\_ave\_UP(L_{ji}))$ The validation of the attenuation measures aims to verify that no contradictions exist in the set of measures collected for the same line and generally occurs through three types of validity checks: range check, variability check and coherence check.

Specifically, the range check verifies that the measured attenuation values fall within 'physically' meaningful ranges with respect to network conditions. In case of ADSL systems, the following can for example be imposed:

constraints on minimum attenuations: for example, both for the attenuation value on the uplink and for the one on the downlink, no values lower than 1 dB are allowable. This because the link between permutator 9 and DSLAM 10 typically implies an attenuation of signals crossing it that is greater than such value.

constraints on maximum attenuations: for example, for the attenuation values on the uplink, no values greater than 50 dB are allowable, since greater values would be associated to such electric distances as not to allow using not only the xDSL service, but also the traditional telephone service. Other constraints on maximum attenuations can instead be due to upper limits imposed by network apparatus (DSLAM, CPE etc) that perform both the measure and its related storage of attenuation values.

The variability check verified that in time no significant variations occurred on attenuation values measured along xDSL lines $L_{ji}$. In order to perform such check, constraints are imposed on the difference between maximum and minimum values of attenuations related to the uplink and downlink of said lines. With the same line wiring (number of lengths/cable types/diameters etc.), the difference between maximum and minimum attenuation values in time is caused only by thermal variations that are relatively low (for example less than about 1 dB). However, even in this case it is advisable to take into account the accuracy with which the measuring xDSL equipment store values measured thereby: for example, some DSLAM (old generation type) store only integer values of measured ADSL attenuation values. In this case, it is preferable to increase the width of the variability range allowed for the difference between maximum and minimum attenuation values (an acceptable value for such range could be for example 2 dB).

Finally, the coherence check verifies that the relationship between attenuation values related to the uplink and downlink of a same xDSL line has a 'physically' reasonable value. For example, given the spectrum allocations dedicated to transmissions for the uplink and downlink, it would be not admissible, for a signal of the ADSL type, to have an attenuation value on the downlink that is less than the one detected on the uplink, while, for a signal of the SDSL type, the relationship between the two attenuation values should practically be a unit. In general, the relationship between attenuation values related to the uplink and downlink of a same xDSL line $L_{ji}$ depends on the type of cable in which the line is comprised, and is particularly sensitive to the diameter of the copper pairs container in said cable (in systems such as the first generation ADSL, it can also depend on the bit rates at which the line is operating on the respective uplink and downlink). The Network operator, depending on the knowledge of cables used in its own network and on tolerances included in the attenuation measures performed by its own xDSL equipment, can previously characterise the limits within which the attenuation values relationship can be contained.

If for a line $L_{ji}$ only one of range and/or variability checks is not observed, the line and its related attenuation measures are discarded from the set $\{L_{ji}\}$. If instead range and variability checks are passed, while the coherence check is not, the line will be marked with a flag that will be used in Step 3 without any other evaluation criteria of the quality of measures associated with the line itself. The reason for this different importance assigned to the above described types of check is that, for first generation ADSL systems, the attenuation measure related to the downlink is in general scarcely reliable and this can strongly impair the values obtained for the relationship between attenuations and therefore the results produced by the coherence check. In particular, for all lines that passed the range and variability checks, it is possible to go on giving a value to logic variable Flag_Atn($L_{ji}$) equal for example to 1 if the relationship of attenuation values related to the downlink and uplink of the above lines complies with the previously located limits or equal to 0 otherwise.

Concluding, at the end of this step, every line $L_{ji}$ that has passed the range and variability checks will be characterised by the mean attenuation value associated with its uplink Att_ave_UP($L_{ji}$), possibly corrected by the additional value P(Att_ave_UP(Lji)) and the logic variable Flag_Atn($L_{ji}$), associated with the coherence check result.

Step 3

In this step, initially the mean attenuation value is estimated on the uplink related to each one of the distribution points of the broadband type of the set $\{D_j\}$ to which the xDSL lines $L_{ji}$ are jointed. In particular, such mean attenuation value is computed starting from the mean attenuation values related to the uplink of the above xDSL lines $L_{ji}$. Specifically, the estimation is performed on all distribution points of the broadband type $\{D_j\}$ equipped with validated measures of the DELT type and is equipped with additional information related to its reliability. The main concept used for estimating the mean attenuation value to the single distribution point of the broadband type $D_j$ is having a certain degree of coherence between attenuation measures associated with all lines jointed to such distribution point: this because it is assumed that lines of a same distribution point mutually have attenuation measures with reduced dispersion, since, belonging to a same condominium or to different living buildings grouped in a very narrow geographical area, they share the same path in the access network 2 between central and distribution point.

The location of distribution points of the broadband type $\{D_j\}$ in the access network 2 is therefore based on the estimation of the mean attenuation value of various distribution points. Due to many factors, for example the excessive dispersion of available attenuation measures on the same distribution point, such location can however be unreliable or even not able to be actuated. Therefore, at the end of this step, the distribution points of the broadband type $D_j$ associated to xDSL lines $L_{ji}$ will be classified into one of the following categories:

Distribution points of the G type (Guide distribution point): distribution points for which the location has to be considered certain, since the mean attenuation value estimated for them is reliable;

Distribution points of the A type (Ambiguous distribution point): in this case, the location of the distribution points cannot be considered certain and will be the object of further evaluations in the following step of the analysis method since the estimated mean attenuation value for these distribution points is only "relatively" reliable;

Distribution points of the D type (Discarded distribution point): distribution points that are discarded due to the lack of correlation between attenuation measures associated with xDSL lines $L_{ji}$ jointed thereto.

Figure 4:
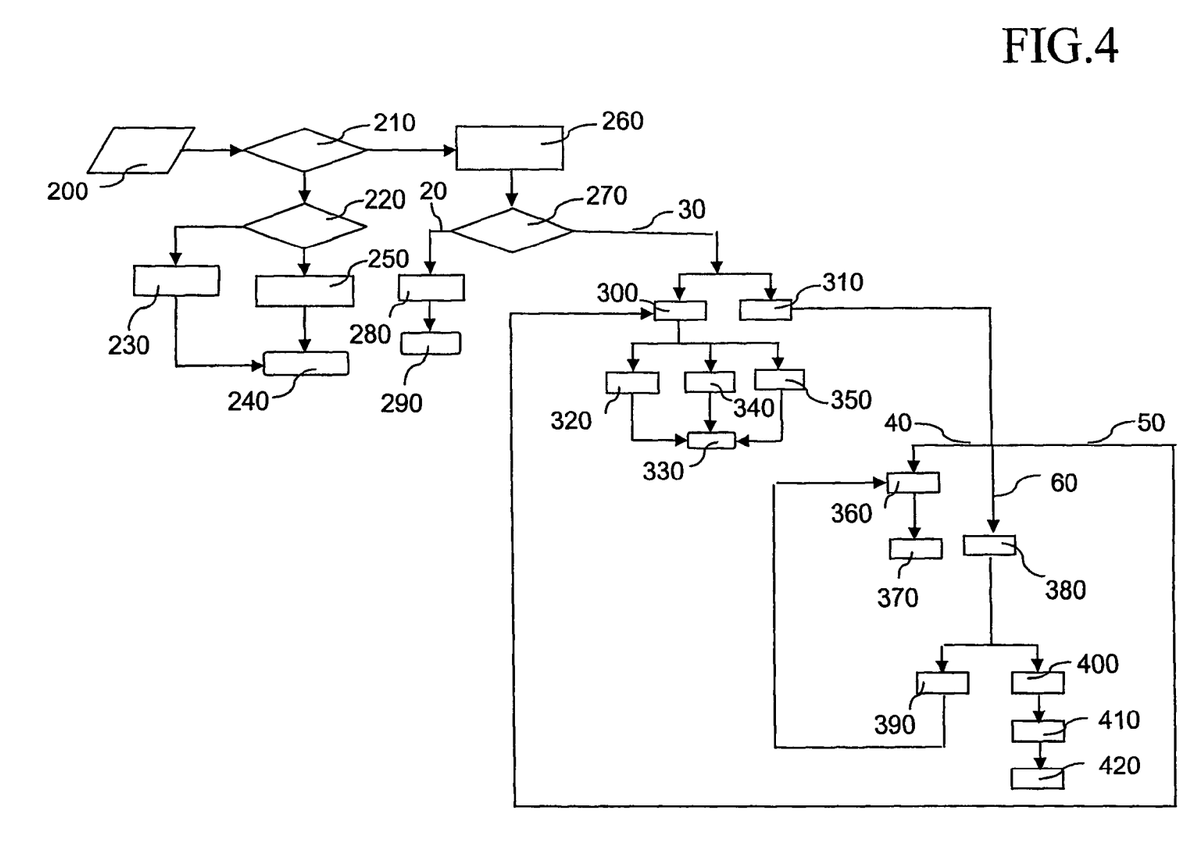
FIG. 4 shows a flow diagram related to a step of the analysis method according to the invention.

More particularly, FIG. 4 shows a possible flow diagram related to step 3, as it is applied on a generic distribution point of the broadband type $D_j$ equipped with $|L_{ji}|$ validated measures of the DELT type (block 200 in FIG. 4).

Always referring to FIG. 4, it occurs that if to the distribution point of the broadband type $D_j$ only one xDSL line is jointed to validated measures of the DELT type, namely $|L_{ji}|$ is equal to 1, (block 210 in FIG. 4). If this is the case, it is not possible to verify whether there is a certain degree of coherence between attenuation measures associated to many xDSL lines $\{L_{ji}\}$; therefore, in order to decide whether it is suitable to locate the distribution point of the broadband type $D_j$ depending on the single xDSL line $L_{ji}$ jointed thereto, the coherence is checked (block 220 in FIG. 4) between attenuation values on the uplink and downlink of the available line, namely it is checked whether logic variable Flag_Atn associated with the xDSL line $L_{ji}$ is, for example, equal to 1 (value for which there is coherence in the relationship between attenuations related to the downlink and uplink of the line). If this condition is verified, the distribution point of the broadband type $D_j$ is assigned the mean attenuation value on the uplink of its own xDSL line $L_{ji}$ and the distribution point of the broadband type $D_j$ is classified with type A, namely the performed estimation is not deemed completely reliable (block 230 in FIG. 4). Now the location procedure of the generic distribution point of the broadband type $D_j$ ends (block 240 in FIG. 4). If instead logic variable Flag_Atn is, for example, equal to zero, the distribution point of the broadband type $D_j$ is classified as type D and no attenuation value is assigned thereto (block 250 in FIG. 4); the location procedure of the generic distribution point of the broadband type $D_j$ therefore ends (block 240 in FIG. 4).

Let us now consider the general case in which, to the distribution point of the broadband type $D_j$ two or more xDSL lines $\{L_{ji}\}$ are jointed with validated measures of the DELT type, namely $|L_{ji}|>1$. Preliminarily, it is important to establish a condition related to the maximum attenuation dispersion parameter (Max_Disp_DP) that can be associated with the distribution point $D_j$, meaning as attenuation dispersion the difference between maximum attenuation value and minimum attenuation value related to the uplink of the set of xDSL lines $\{L_{ji}\}$ jointed to the distribution point. The above cited condition is established assuming that, since the set of xDSL lines $\{L_{ji}\}$ jointed to the same distribution point has shared in a network the majority of the path, what can differentiate their attenuation value is only the subscriber loop joining the distribution point with the subscriber equipment (xDSL modem).

In order to establish the maximum attenuation dispersion parameter Max_Disp_DP it is advisable to have the following information available:

- typical structure of living buildings of the portion of territory served by the Operator's access network (typically a portion of territory characterised by living models based on palaces will have a greater attenuation dispersion with respect to an urban area based on single-family houses (for example the xDSL lines of a sky-scraper will have more widespread attenuation values given the nature itself of the living structure);
- main types and characteristics (cable type, diameter, insulation, etc.) of subscriber loops;
- attenuation value typically introduced by a medium-quality subscriber system.

Moreover, in order to establish the maximum attenuation dispersion parameter Max_Disp_DP, it is important to take into account also the tolerances related to measuring methods used by xDSL equipment, the accuracy of systems for storing such measures and the attenuation variations due to thermal effects.

As an example, a reasonable value in a urban area for the maximum attenuation dispersion parameter Max_Disp_DP, if attenuation measures performed by ADSL1 equipment are used, can be on the order of 4 dB.

With reference again to FIG. 4, after having fixed a value for the maximum attenuation dispersion parameter Max_Disp_DP, Step 3 of the analysis method according to the invention provides for the following.

For every distribution point of the broadband type $D_j$ with a number of xDSL lines $\{L_{ji}\}$ greater than 1, in a vector Att_ave_UP, values Att_ave_UP($L_{ji}$) of available attenuation measures for each uplink of the above lines are ordered in an ascending way, and their dispersion value (Disp_DP) is evaluated:

$$\text{Disp\_DP} = \max_i(\text{Att\_ave\_UP}(L_{ji})) - \min_i(\text{Att\_ave\_UP}(L_{ji}))$$

(block 260 in FIG. 4). This value is then compared with the previously set maximum attenuation dispersion parameter (Max_Disp_DP) (block 270 in FIG. 4).

If the attenuation dispersion value (Disp_DP) on the distribution point of the broadband type $D_j$ is lower that the maximum established one Disp_DP<Max_Disp_DP (line 20 in FIG. 4), then it is possible to assign to the distribution point a mean attenuation value for the uplink with a high reliability degree, so that:

- the distribution point of the broadband type $D_j$ is classified as belonging to category G (DP_type($D_j$)=G)
- the relative mean attenuation value for the uplink Atn_DP ($D_j$) is the arithmetic mean of mean attenuation values for the uplink related to the xDSL lines $\{L_{ji}\}$ jointed to the distribution point itself $$\left(\text{Atn\_DP}(D_j) = \frac{1}{|L_{ji}|} \cdot \sum_i \text{Att\_ave\_UP}(L_{ji})\right)$$

(block 280 in FIG. 4).

Now the location procedure of the generic distribution point of the broadband type $D_j$ ends (block 290 in FIG. 4).

If instead the attenuation dispersion value (Disp_DP) on the distribution point of the broadband type $D_j$ is greater than the previously fixed maximum attenuation dispersion parameter (Max_Disp_DP), namely Disp_DP≥Max_Disp_DP (line 30 in FIG. 4), the analysis method according to the invention provides that the attenuation measures that are unrelated with respect to the set of measures $|L_{ji}|$ related to xDSL lines $L_{ji}$ jointed to the distribution point are located and discarded.

In particular, two cases can be distinguished, according to the number of xDSL lines $\{L_{ji}\}$ with validated measures of the DELT type: $|L_{ji}|=2$ e$|L_{ji}|>2$.

If only two xDSL lines $L_{ji}$ with validated measures of the DELT type are jointed to the distribution point, namely $|L_{ji}|=2$, (block 300 in FIG. 4), it is not possible to establish from a simple comparison of measures which between the two attenuation values associated with the uplink of the two xDSL lines $L_{ji}$ can be discarded; in this case, the analysis method according to the invention provides that, between the two xDSL lines $L_{ji}$ available, only the one that has coherence between mean attenuation values for its own uplink and downlink (namely Flag_Atn($L_{ji}$)=1) is taken into account. In particular the following is valid.

- if none of the two xDSL lines $L_{ji}$ has a coherence between mean attenuation values for the respective uplink and downlink, namely Flag_Atn($L_{ji}$)=0 for both lines, the distribution point is classified of the D type (DP_type ($D_j$)=D) ad no attenuation value is assigned thereto Atn_DP($D_j$)='-' (block 320 in FIG. 4); now the location procedure of the generic distribution point of the broadband type $D_j$ ends (block 330 in FIG. 4).
- if only one among the xDSL lines $L_{ji}$ jointed to the distribution point of the broadband type $D_j$ has a coherence between mean attenuation values for the respective uplink and downlink, namely Flag_Atn=1, then the mean attenuation value assigned to the distribution point is equal to the mean attenuation value for the uplink related to such line (Atn_DP($D_j$)=Att_ave_UP ($L_{ji}$) and the distribution point is classified of type A (DP_type ($D_j$)=A) (block 340 in FIG. 4); now the location procedure of the generic distribution point of the broadband type $D_j$ ends (block 330 in FIG. 4).
- if both xDSL lines $\{L_{ji}\}$ jointed to the distribution point of the broadband type $D_j$ have a coherence between respective mean attenuation values for uplink and downlink, namely Flag_Atn=1 for both lines, then the mean attenuation value assigned to the distribution point is equal to the arithmetic mean of the attenuation values for the uplink of both lines $$\left(\text{Atn\_DP}(D_j) = \frac{1}{2} \cdot \sum_{i=1}^{2} \text{Att\_ave\_UP}(L_{ij})\right)$$

and the distribution point is classified as type A (DP_type ($D_j$)=A) (block 350 in FIG. 4); now the location procedure of the generic distribution point of the broadband type $D_j$ ends (block 330 in FIG. 4).

If instead to the distribution point of the broadband type $D_j$ a number of xDSL lines $\{L_{ji}\}$ is jointed with validated measures of the DELT type greater than 2, namely $|L_{ji}|>2$, always supposing that the attenuation dispersion value (Disp_DP) on the distribution point of the broadband type $D_j$ is greater than the previously used maximum attenuation dispersion parameter, namely Disp_DP≥Max_Disp_DP, (block 310 in FIG. 4), it is attempted to locate and discard the xDSL lines $\{L_{ji}\}$ responsible for the excessive attenuation dispersion (Disp_DP) in order to reduce this latter one below the maximum attenuation dispersion parameter Max_Disp_DP. Such lines are those with which the attenuation values are associated:

max$_i$(Att_ave_UP(L$_{ji}$)), namely Att_ave_UP(|L$_{ji}$|)
min$_i$(Att_ave_UP(L$_{ji}$)), namely Att_ave_UP(1).

where the position of such values in vector Att_ave_UP depends on the chosen ordering for realising such vector (block 260 in FIG. 4). Such values are removed from vector Att_ave_UP if it happens for them the lack of correlation with respect to the other attenuation measures available for each uplink related to the distribution point D$_j$. In particular, the Att_ave_UP(|L$_{ji}$|) value is deemed uncorrelated and therefore removed from vector Att_ave_UP if it is different from the attenuation measure nearest thereto (Att_ave_UP(|L$_{ji}$|−1)) by more than a fixed threshold (Thr_DP); while value Att_ave_UP(1) is deemed uncorrelated and therefore removed from vector Att_ave_UP if it is different from the attenuation measure nearest thereto (Att_ave_UP(2)) by more than a fixed threshold (Thr_DP)

The location of uncorrelated elements present in vector Att_ave_UP is applied iteratively, keeping track upon every iteration of how many values have been removed (consequently reviewing value |L$_{ji}$| every time) and again evaluating the attenuation dispersion value (Disp_DP) on the distribution point of the broadband type D$_j$.

Downstream of every single iteration, the procedure described in block 310 continues to be iterated if the result of the previously ended iteration has produced a removal from vector Att_ave_UP, the number of values still present in vector Att_ave_UP is greater than 2 and the attenuation values dispersion is still greater than the fixed maximum attenuation dispersion parameter.

If the iteration of block 310 in FIG. 4 ends, the following cases can occur
 the attenuation dispersion value (Disp_DP) on the distribution point of the broadband type D$_j$ has been reduced below the maximum allowed value, namely Disp_DP<Max_Disp_DP (line 40 in FIG. 4). In this case (block 360 in FIG. 4) the distribution point of the broadband type D$_j$ is classified of the G type (DP_type(D$_j$)= G); the related mean attenuation value for the uplink Atn_DP(D$_j$) is the arithmetic mean of mean attenuation values for the uplink related to xDSL lines {L$_{ji}$} jointed to the distribution point itself and still available downstream of discards produced in block 310

$$\left( \text{Atn\_DP}(D_j) = \frac{1}{|L_{ji}|} \cdot \sum_i \text{Att\_ave\_UP}(L_{ji}) \right).$$

Now the location procedure of the generic distribution point of the broadband type D$_j$ ends (block 370 in FIG. 4).
 the attenuation dispersion value (Disp_DP) on the distribution point of the broadband type D$_j$ has not been reduced below the maximum allowed value, namely Disp_DP≥Max_Disp_DP (line 50 in FIG. 4) and on the distribution point, downstream of discards performed in block 310, only two xDSL lines L$_{ji}$ are available with validated measures of the DELT type. In this case, the location procedure of the generic distribution point of the broadband type D$_j$ provides that the same steps previously described and contained in blocks 300-320-330-340-350 in FIG. 4, are performed;
 the attenuation dispersion value (Disp_DP) on the distribution point of the broadband type D$_j$ has not been reduced below the fixed maximum attenuation dispersion parameter, namely Disp_DP≥Max_Disp_DP (line 60 in FIG. 4) and at the distribution point, downstream of discards performed in block 310, more than two xDSL lines L$_{ji}$ are available with validated measures of the DELT type. In this case the mean square deviation (σ) of |L$_{ji}$| mean attenuation measures media related to the uplink is evaluated (block 380 in FIG. 4) and this is compared with a prefixed threshold (Thr_σ).
 If (block 390 in FIG. 4) the mean square deviation (σ) is lower than the threshold Thr_σ (σ≤Thr_σ), then the location procedure provides that the same previously described steps are performed, that are contained in blocks 360 and 370 in FIG. 4;
 If (block 400 in FIG. 4) the mean square deviation (σ) is greater than the threshold Thr_σ (σ≥Thr_σ), then the distribution point of the broadband type D$_j$ is classified of the D type and no attenuation value is assigned thereto (block 410 in FIG. 4); the location procedure of the generic distribution point of the broadband type D$_j$ then ends (block 420 in FIG. 4).

As regards the threshold value Thr_DP, it is a factor that depends on network topology. Such factor can be calibrated depending on the same parameters that brought about the definition of maximum attenuation dispersion parameter Max_Disp_DP, this time do not taking into account the xDSL lines of a whole living unit but, for example, only those belonging to contiguous floors. An acceptable threshold value in a network where there is typically one distribution point per palace is about 2 dB.

As regards the choice of the threshold value Thr_σ, this latter one is a factor that can be obtained depending on the fixed value for the maximum attenuation dispersion parameter Max_Disp_DP evaluating the mean square deviation that is realised on the distribution points of the broadband type with more than two xDSL lines L$_{ji}$ mutually jointed with validated measures of the DELT type and with Disp_DP<Max_Disp_DP.

At the end of previously described Step 3, it can be deemed that a certain number of distribution points of the broadband type D$_j$ has been located through vector Atn_DP, some of which in an assured way (distribution points of the G type), other in an unassured way (distribution points of the A type), through vector DP_type; the other distribution points (distribution points discarded or of the D type) will not be taken into account any more in the following steps of the analysis method according to the invention.

Step 4

This step evaluates, for cabinet area A$_L$ to which the line to be qualified is jointed, the maximum and minimum attenuation values of the distribution points of the broadband type D$_j$ related thereto. In fact, it has to be noted that, though in Step 3 a first location of these distribution points has been performed, for the distribution points of the broadband type D$_j$ classified as of type A such location is not yet assured.

Since that, due to the variability of subscriber systems, it is much more probable to perform an over-estimation of the attenuation related to a distribution point than an under-estimation, since subscriber systems, being often of a low quality, can introduce an additional attenuation component, the major problem is the distinction between cases of distribution points classified as of type A actually remote from the exchange with respect to those wrongly located as remote due to a low-quality subscriber system. Distinguishing between these two cases means recognising the cases of a secondary networks actually wide spread with respect to cases in which the secondary network wrongly appears much spread due to attenuation over-estimations.

The problem is dealt with by evaluating the degree of coherence of the location of distribution points of the broadband type Dj being part of the cabinet area A$_L$ with respect to 'typical situations', linked to homogeneous network and territory situations (for example urban areas, extra-urban areas), that can occur in the network portion in which such cabinet area is placed. Such 'typical situations' are identified through a parameter Max_Disp_Cab that represents the maximum attenuation dispersion allows on the cabinet areas of the considered network portion, whose knowledge can be obtained with one of the procedures described below:

procedure 1) cabinet areas are taken into account, that are present in the considered network portion, that have their distribution point remotest from the central (namely the one with highest attenuation) classified of the G type, and, depending on these, the Cumulative Distribution Function is evaluated for the difference between maximum value and minimum value of attenuations associated with such distribution points of the G type cabinet by cabinet, namely the cumulative distribution of the attenuation dispersion parameter $Disp_k = \max_j(Atn\_DP(D_{jk})) - \min_j(Atn\_DP(D_{jk}))$ is computed, where $Disp_k$ represents the dispersion in terms of attenuation of the k-th cabinet area of the considered network portion. As regards the analysis method according to the invention, the parameter Max_Disp_Cab is the 90-th percent ("quantile") of such distribution. The choice of the 90-th percent is not constraining, but in analyses performed for defining the analysis method according to the invention, this was the value that allowed obtaining the best results. Procedure 1) supposes that the relevant cumulative distribution be statistically significant with respect to the considered network portion, namely that it has been possible to locate inside the above network portion many cabinet areas where the distribution point with the highest attenuation value is of the G type;

procedure 2) topologic knowledge are exploited beforehand on the network, such as to make it possible to choose Max_Disp_Cab;

procedure 3) it is an iterative procedure that will be described below.

Specifically, in Step 4, the analysis method according to the invention provides for previously ordering the attenuation values related to various distribution points of the broadband type $D_j$ of the cabinet area $A_L$ in an increasing order and to take into account a maximum limit Thr_cab between two consecutive attenuation values.

The value to be imposed to the maximum limit Thr_cab can change according to the considered network portion, as well as the value obtained for parameter Max_Disp_Cab can change. In particular, the value to be imposed to the maximum limit Thr_cab is obtained as follows:

$$Thr\_cab = k * Max\_Disp\_Cab/(R-1)$$

where k is a corrective factor that takes into account the mean distance between two consecutive distribution points of the broadband type $D_j$ given by:

$$k = \sum_{i=1}^{R-S+1} i \cdot \left( \sum_{j=1}^{R-i-S+2} \frac{\binom{R-i-j}{S-2}}{\binom{R}{S}} \right)$$

where R is the mean number of distribution points of the broadband type $D_j$ of the cabinet areas of the considered network portion, S is the mean number of distribution points of the broadband type $D_j$ located in Step 3, both of the G type and of the A type, for the cabinet areas of the considered network portion (it will be S≤R).

After having established the values of parameter Max_Disp_Cab and maximum limit Thr_cab, Step 4 of the analysis method according to the invention will now be described with reference to the flow diagram shown in FIG. 5.

Figure 5:
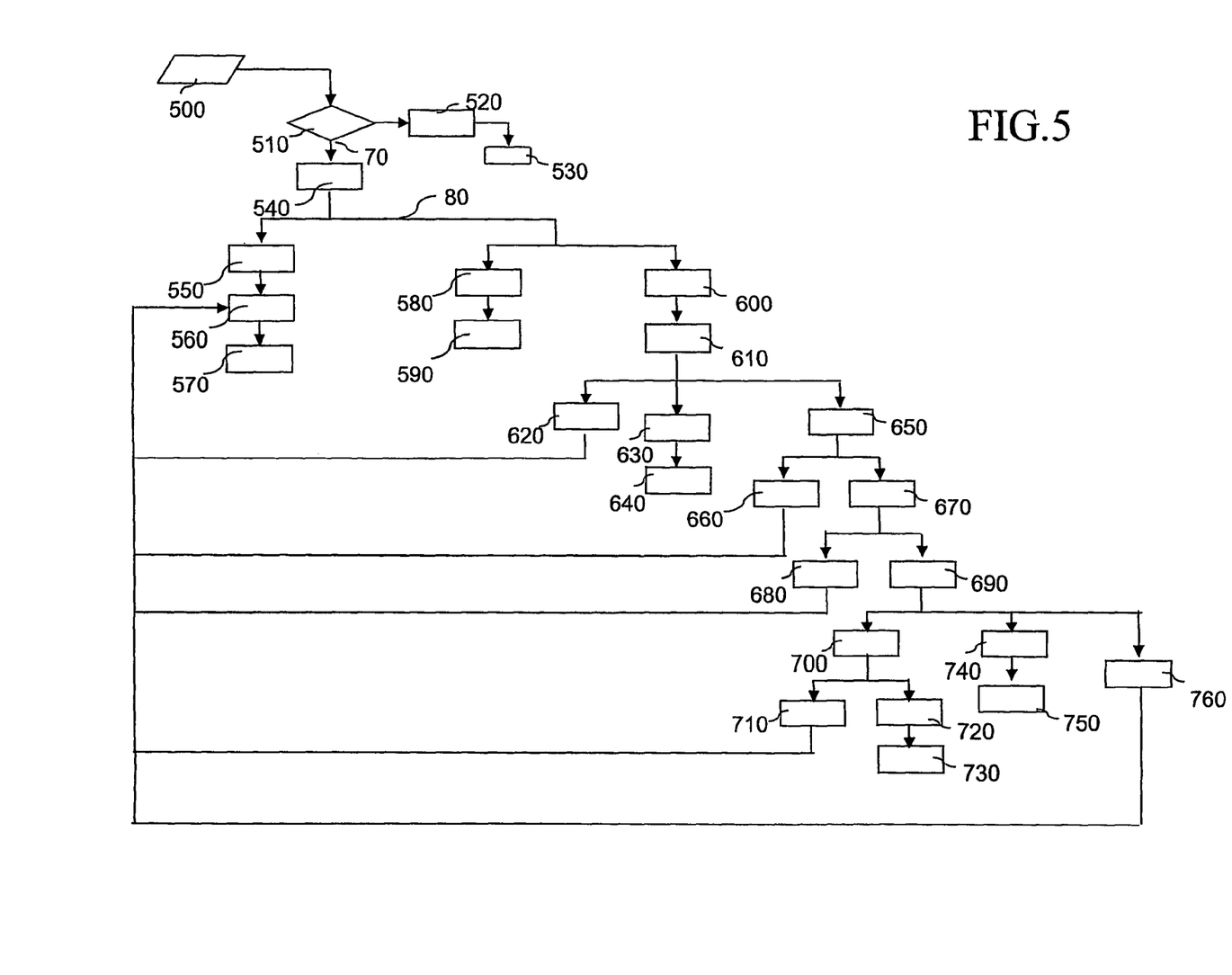
FIG. 5 shows a flow diagram related to a further step of the analysis method according to the invention.

Step 4 has as inputs vectors $Atn\_DP(D_j)$ and $DP\_type(D_j)$ related to cabinet area $A_L$ (block 500 in FIG. 5). Vectors $Atn\_DP(D_j)$ and $DP\_type(D_j)$ represent, respectively, the attenuation value assigned to the generic distribution point of the broadband type Dj and the type of classification assigned to the same distribution point. Index j of Dj changes in order to identify only the distribution points of the G type and the A type remained after Step 3. Vector $Atn\_DP(D_j)$ should be ordered in an ascending way, reviewing in a congruent way also the positions of elements of vector $DP\_type(D_j)$.

Always with reference to FIG. 5, it is checked whether in cabinet area $A_L$ there is a single distribution point of the broadband type $D_j$ (independently whether of the A type or of the G type), namely $|D_j|=1$ (block 510 in FIG. 5). If this is the case, (block 520 in FIG. 5) the area is discarded since it is not possible to estimate an interval of attenuations from the single available attenuation value. Now the analysis method for a line to be qualified that belongs to a cabinet area $A_L$ of such kind is interrupted without providing results (block 530 in FIG. 5).

If instead in the cabinet area $A_L$ there are two or more distribution points of the A or G type, namely $|D_j|>1$ (line 70 in FIG. 5) the dispersion $Disp\_Cab = \max_j(Atn\_DP(D_j)) - \min_j(Atn\_DP(D_j))$ of the cabinet area $A_L$ is evaluated and is compared with the maximum allowed dispersion Max_Disp_Cab (block 540 in FIG. 5).

If Disp_Cab<Max_Disp_Cab or the last distribution point (namely the one that has the highest attenuation value) of the cabinet area $A_L$ has been located in a reliable way (DP_type $(|D_j|)=G$) (block 550 in FIG. 5), then it is assumed (block 560 in FIG. 5):

as minimum attenuation value related to the cabinet area $A_L$, the minimum value of the distribution points related to the above area, namely $Min\_Cab = \min_j(Atn\_DP(D_j))$, independently whether such minimum attenuation value is related to a distribution point of the A type or the G type, this because, as already stated, attenuation underestimations are rare;

As maximum attenuation value related to the cabinet area $A_L$, the maximum attenuation value of the distribution points related to the above area, namely $Max\_Cab = \max_j(Atn\_DP(D_j))$;

As mean attenuation value related to the cabinet area $A_L$, the mean of attenuation values of the distribution points related to the above area, namely $$Avg\_Cab = \frac{1}{|D_j|} \cdot \sum_j ATN\_DP(D_j)$$

The distribution points discard procedure then ends (block 570 in FIG. 5).

If instead the last distribution point of the cabinet area $A_L$ is of type A (DP_type($D_j$)=G) or the cabinet area dispersion is greater than the maximum allowed one (Disp_Cab≥ Max_Disp_Cab) (line 80 in FIG. 5) different cases are provided:

A) if for the cabinet area $A_L$ only two distribution points remained ($|D_j|=2$) (block 580 in FIG. 5), it is not possible to reliably evaluate the extension of secondary network and cabinet $A_L$ is discarded. The analysis method according to the invention for qualifying a line that belongs to a cabinet area $A_L$ of such kind is then interrupted without providing results (block 590 in FIG. 5);

B) if the number of distribution points of the broadband type $D_j$ is greater than 2 ($|D_j|>2$) (block 600 in FIG. 5), iteratively in block 610 the distribution point with highest attenuation value is removed (namely the "remotest" one $Atn\_DP(|D_j|)$) if its attenuation value is far from the immediately previous one $Atn\_DP(|D_j|-1)$ more than Thr_cab. Upon every iteration, Disp_Cab is re-computed and some mutually exclusive conditions must occur, that determine output from block 610, namely:

B1) if downstream of every iteration of block 610, on the cabinet area $A_L$ there is Disp_Cab<Max_Disp_Cab or the last distribution point of the cabinet area $A_L$ is of the G type (block 620 in FIG. 5), the procedure provides for re-applying the same previously described decisions related to blocks 560 and 570 in FIG. 5;

B2) if downstream of every iteration of block 610, on the cabinet area $A_L$ only two distribution points of the broadband type are available ($|D_j|=2$) (block 630 in FIG. 5), in this case it is not possible to reliably evaluate the extension of secondary network and cabinet $A_L$ is discarded. The analysis method according to the invention for qualifying a line that belongs to a cabinet area $A_L$ of such kind is then interrupted without providing results (block 640 in FIG. 5);

B3) if downstream of every iteration of block 610, the last two distribution points of the broadband type $D_j$ of the ordered set differ as attenuation by less than Thr_cab (block 650 in FIG. 5) then, in this case, if the last-but-one distribution point is of the G type (block 660 in FIG. 5), in the set of distribution points of the broadband type $\{Dj\}$ both last and last-but-one distribution points are kept and the same, previously described decisions are applied again, related to blocks 560 and 570 in FIG. 5. If instead also the last-but-one distribution point of the broadband type $D_j$ is of the A type (block 670 in FIG. 5), the offset $\Delta$ is evaluated between "last-but-one" and "last-but-two" distribution points. In fact, it is deemed that the presence of three distribution points with attenuation measures that are not strongly uncorrelated apart from the respective classification category is a sufficient condition for deeming the attenuation measures related thereto as reliable: therefore, if $\Delta$<Thr_cab (block 680 in FIG. 5) all three distribution points are kept in the set of distribution points of the broadband type $\{Dj\}$ and the same previously described decisions are applied again, related to blocks 560 and 570 in FIG. 5. Vice versa, if $\Delta$>Thr_cab, (block 690 in FIG. 5) last and last-but-one distribution points are discarded from the set of distribution points of the broadband type $\{Dj\}$. In this latter case:

if two distribution points remain in the set (block 700 in FIG. 5) and for such distribution points Disp_Cab<Max_Disp_Cab or the last distribution point of the cabinet area $A_L$ is of the G type (block 710 in FIG. 5), the same previously described decisions are applied again, related to blocks 560 and 570 in FIG. 5. If instead there is a greater dispersion that the maximum allowed one or there is a last distribution point of the A type (block 720 in FIG. 5), it is not possible to reliably evaluate the extension of the secondary network and cabinet $A_L$ is discarded. The analysis method according to the invention for qualifying a line that belongs to a cabinet area $A_L$ of such kind is then interrupted without providing results (block 730 in FIG. 5)

if a single distribution point remains (namely, there were three distribution points before the removal) (block 740 in FIG. 5), it is not possible to reliably evaluate the extension of the secondary network and cabinet $A_L$ is discarded. The analysis method according to the invention for qualifying a line that belongs to a cabinet area $A_L$ of such kind is then interrupted without providing results (block 750 in FIG. 5)

if instead there remain more than two distribution points (block 760 in FIG. 5), then the same previously described decisions are applied again, related to blocks 560 and 570 in FIG. 5.

At the end of Step 4, for cabinet $A_L$ to which the line to be qualified is jointed, the following values will be available:

minimum attenuation $Min\_Cab = \min_j(Atn\_DP(D_j))$;

maximum attenuation $Max\_Cab = \max_j(Atn\_DP(D_j))$;

$$\text{mean attenuation } Avg\_Cab = \frac{1}{|D_j|} \cdot \sum_j ATN\_DP(D_j)$$

The results of the above described Step 4 can be affected by the choice of parameter Max_Disp_Cab. In order to make such choice more accurate, the iterative procedure can be used, previously designated as procedure 3, and described below:

1. the whole above described Step 4 is performed a first time on all cabinet areas of the considered network portion, using an attempt value of Max_Disp_Cab (for example the one estimated through procedure 1), even if obtained from a statistically scarcely significant sample of distribution points of the G type).

2. downstream of this, the cumulative distribution of attenuation dispersion parameter $Disp_k = \max_j(Atn\_DP(D_{jk})) - \min_j(Atn\_DP(D_{jk}))$, where $Disp_k$ represents the dispersion in terms of attenuation of the k-th cabinet area. The 90-th percent of the above computed distribution is considered as new value of parameter Max_Disp_Cab and Step 4 is applied again starting from original data.

3. the above described procedure is repeatedly applied, till the cumulative distributions obtained from two consecutive iterations has neglectable differences, this meaning that the procedure has come to a convergence. As final value to be applied to parameter Max_Disp_Cab, the 90-th percent related to the cumulative distribution obtained in the last iteration is used.

Step 5

At the end of Step 4, for the cabinet area $A_L$ to which the line to be qualified belongs, a range of attenuation values (included in range Min_Cab÷Max_Cab) is anyway available, obtained depending on distribution points of the broadband type $D_j$ with validated measures associated with the above cabinet area $A_L$: such distribution points are only a subset of the set of distribution points of the broadband type belonging to the considered cabinet area.

Purpose of Step 5 is performing an estimation of the range of attenuations of the whole cabinet area $A_L$.

If in the previous step for estimating the attenuation dispersion of the cabinet area $A_L$, defined as Disp_cab=Max_Cab-Min_Cab, only $|D_j|$ distribution points of the broadband type have been used on N_dp distribution points present in the cabinet area itself, a better estimation of this dispersion, herein below defined as New_Disp_cab, can be obtained using the following formula:

$$\text{New\_Disp\_cab} = (N\_dp - 1) * \text{Disp\_cab}/h,$$

with $$h = \sum_{i=|D_j|-1}^{N\_dp-1} i \cdot \frac{\binom{i-1}{|D_j|-2}}{\binom{N\_dp}{|D_j|}} \cdot (N\_dp - i).$$

Parameter h describes the mean of distances, expressed in number of intervals, between the "remotest" and the "nearest" distribution points of the broadband type $D_j$ to cabinet $A_L$ assuming N_dp distribution points at the same distance between them.

After having computed New_Disp_cab, also Min_Cab and Max_Cab values should be modified: in particular, the difference between the new attenuation dispersion value New_Disp_cab and the original value Disp_cab can be divided on Min_Cab and Max_Cab values proportionally with respect to the mean of attenuation Avg_Cab. In formulas, having defined $$\alpha = \frac{\text{Max\_Cab} - \text{Avg\_Cab}}{\text{Disp\_cab}},$$

the new estimations of Min_Cab and Max_Cab will be:

$$\text{New\_Max\_Cab} = \text{Max\_Cab} + \alpha \cdot (\text{New\_Disp\_cab} - \text{Disp\_cab});$$

$$\text{New\_Min\_Cab} = \max(\delta, \text{Min\_Cab} - (1-\alpha) \cdot (\text{New\_Disp\_cab} - \text{Disp\_cab}))$$

where δ is the value set in step 2 related to the constraint on minimum attenuations (for example 1 dB). In this way New_Min_Cab cannot assume values lower than δ, limit below which it is deemed that an attenuation measure has no physical meaning.

Step 6

Depending on hypotheses associated with the line to be qualified obtained taking into account:
- the types of services associated with lines (disturbing lines) sharing the same access network path with the line to be qualified and such as to overlap the spectrum related to the uplink or downlink of the xDSL service for which the line is being qualified;
- cable cross talk characteristics, that allow evaluating the portion of signal due to disturbing systems that can be translated into noise on the line being qualified, New_Min_Cab and New_Max_Cab values obtained at the end of Step 5 can be translated into bit rates that can be offered with a certain xDSL technology on lines belonging to the cabinet area $A_L$ and therefore on the line to be qualified, using for example the methods for estimating xDSL performance described in ETSI Specifications related to Spectrum Management (ETSI TR 101 830).

At the end of Step 6, an estimation of the set of bit rates that can be offered has therefore been obtained, with a certain xDSL technology, on lines belonging to the cabinet area $A_L$ and therefore on the line to be qualified.

Moreover, if the line to be qualified is jointed to one among the $|D_j|$ distribution points of the broadband type of the cabinet area $A_L$ still available after having performed Step 5 (namely to a distribution point of the broadband type that is reliably located), the exact bit rate value that can be offered to users jointed to such distribution point can be deemed as estimated.

For lines to be qualified belonging to a network of the rigid type, namely characterised by the absence of cabinets, the analysis method according to the invention can be applied using Steps 1, 2, 3 and 6. In fact, through the first three steps, the distribution point of the broadband type to which the line to be qualified is jointed, is located, while in Step 6 the attenuation value assigned to the distribution point is translated into a bit rate that can be offered on the line.

The invention claimed is:

1. A method for analysing status of a subscriber loop belonging to an access network portion of a fixed network infrastructure, said subscriber loop not supporting a broadband service, said access network portion comprising further subscriber loops, a set of which support broadband services, comprising:
   collecting attenuation measures associated with said set of subscriber loops supporting said broadband services, wherein the attenuation measures comprise attenuation measures of the Dual End Loop Test (DELT) type; and
   processing said attenuation measures to obtain an estimation of a maximum bit rate that can be offered on said subscriber loop to be analysed, wherein processing comprises validating said attenuation measures with a range check, a variability check, and a coherence check and computing a mean attenuation value.

2. The method for analysing according to claim 1, wherein said attenuation measures are in messages exchanged between two pieces of terminal equipment respectively placed in a telecommunication central station and in subscriber premises and associated with said subscriber loops supporting said broadband services.

3. The method for analysing according to claim 2, wherein said attenuation measures comprise mean time attenuation values related to uplink and downlink of said subscriber loops supporting said broadband services.

4. The method for analysing according to claim 3, wherein said attenuation measures comprise signal attenuation measures and loop attenuation measures.

5. The method for analysing according to claim 1, wherein processing said attenuation measures comprise:
   computing the mean attenuation value, wherein the mean attenuation value is related to said set of subscriber loops supporting said broadband services starting from mean time attenuation values associated with each of said subscriber loops; and
   estimating said maximum bit rate value that can be offered on said subscriber loop to be analysed starting from said mean attenuation value related to said set of subscriber loops supporting said broadband services.

6. The method for analysing according to claim 5, wherein said mean time attenuation values are related to the uplink of said subscriber loops.

7. The method for analysing according to claim 5, wherein estimating said maximum bit rate value that can be offered on said subscriber loop to be analysed comprises estimating a noise value on said subscriber loop to be analysed depending on the following parameters:
   types of services associated with the subscriber loops that share with the subscriber loop to be analysed the same path in the access network; and cable cross talk characteristics that allow evaluating a portion of signal, due to loops that share with the subscriber loop to be analysed the same path in the access network.

8. A system for analysing status of a subscriber loop belonging to an access network portion of a fixed network infrastructure, said subscriber loop not supporting a broadband service, said access network portion comprising further subscriber loops, a set of which support broadband services, comprises:

a module capable of being configured for collecting attenuation measures associated with said set of subscriber loops supporting said broadband services, wherein the attenuation measures comprise attenuation measures of the Dual End Loop Test (DELT) type; and a module capable of being configured for processing said attenuation measures to obtain an estimation of a maximum bit rate that can be offered on said subscriber loop to be analysed, wherein processing comprises validating said attenuation measures with a range check, a variability check, and a coherence check and computing a mean attenuation value.

9. A non-transitory computer-readable medium storing a computer program product comprising codes that, when executed, perform the analysis method according to claim 1.

* * * * *